US011195256B2

United States Patent
Kuwabara

(10) Patent No.: US 11,195,256 B2
(45) Date of Patent: Dec. 7, 2021

(54) ELECTRONIC APPARATUS FOR DETERMINING ZENITH OR NADIR OF VR IMAGE, CONTROL METHOD OF ELECTRONIC APPARATUS AND NON-TRANSITORY COMPUTER READABLE MEDIUM

(71) Applicant: CANON KABUSHIKI KAISHA, Tokyo (JP)

(72) Inventor: Yasuhiro Kuwabara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 16/785,833

(22) Filed: Feb. 10, 2020

(65) Prior Publication Data
US 2020/0258198 A1 Aug. 13, 2020

(30) Foreign Application Priority Data
Feb. 12, 2019 (JP) .............................. JP2019-022623

(51) Int. Cl.
*G06T 3/60* (2006.01)
*H04N 5/232* (2006.01)
(Continued)

(52) U.S. Cl.
CPC .............. *G06T 3/60* (2013.01); *G06F 3/0488* (2013.01); *G06F 3/04845* (2013.01);
(Continued)

(58) Field of Classification Search
None
See application file for complete search history.

(56) References Cited

U.S. PATENT DOCUMENTS 6,486,877 B1 * 11/2002 Watanabe ............... G06T 17/10
345/420
2016/0067617 A1 * 3/2016 Tolk ....................... A63F 13/655
463/32
(Continued)

FOREIGN PATENT DOCUMENTS

CN 103402052 A 11/2013
CN 108427595 A 8/2018
(Continued)

OTHER PUBLICATIONS

The above documents were cited in a British Combined Search and Examination Report dated Aug. 6, 2020, which is enclosed, that issued in the corresponding British Patent Application No. 2001597.0.

(Continued)

*Primary Examiner* — Jason A Pringle-Parker
(74) *Attorney, Agent, or Firm* — Cowan, Liebowitz & Latman, P.C.

(57) ABSTRACT

An electronic apparatus, comprising: a memory and at least one processor and/or at least one circuit to perform the operations of the following units: a control unit configured to 1) display, in a display area, at least a part including a reference point out of a VR image expressed by a projection format using a predetermined point as the reference point, and 2) change the reference point in case an instruction is received from a user; and a determination unit configured to determine the reference point as a zenith or a nadir of the VR image.

8 Claims, 10 Drawing Sheets

(51) Int. Cl.
  *H04N 5/262* (2006.01)
  *G06F 3/0484* (2013.01)
  *G06T 5/00* (2006.01)
  *G06F 3/0488* (2013.01)

(52) U.S. Cl.
  CPC ......... *G06T 5/006* (2013.01); *H04N 5/23238* (2013.01); *H04N 5/2628* (2013.01); *G06T 2200/24* (2013.01)

(56) References Cited

U.S. PATENT DOCUMENTS

| | | | |
|---|---|---|---|
| 2017/0200316 A1* | 7/2017 | Giordano | G06Q 30/0273 |
| 2018/0033194 A1 | 2/2018 | Goel et al. | |
| 2018/0061011 A1* | 3/2018 | Kim | G06T 7/11 |
| 2018/0262857 A1* | 9/2018 | Okuma | H04R 3/005 |
| 2019/0035060 A1 | 1/2019 | Kim et al. | |
| 2019/0340737 A1* | 11/2019 | Kawaguchi | H04N 5/217 |

FOREIGN PATENT DOCUMENTS

| | | |
|---|---|---|
| CN | 109074681 A | 12/2018 |
| CN | 109218606 A | 1/2019 |
| JP | 2017-194857 A | 10/2017 |
| JP | 2018-129720 A | 8/2018 |

OTHER PUBLICATIONS

The above documents were cited in a Sep. 13, 2021 Chinese Office Action, a copy of which is enclosed with an English Translation, that issued in Chinese Patent Application No. 202010087558.3.

* cited by examiner

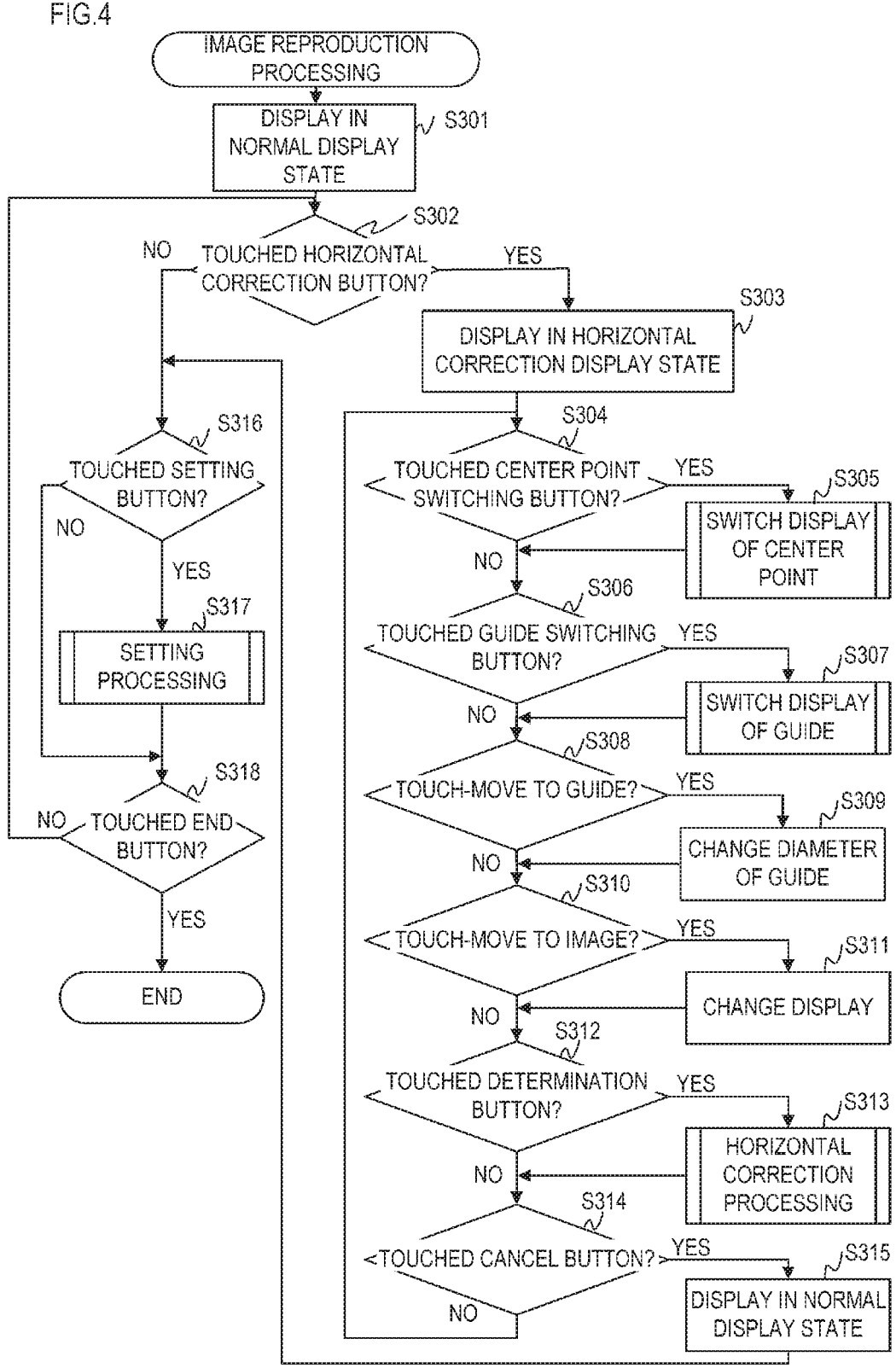

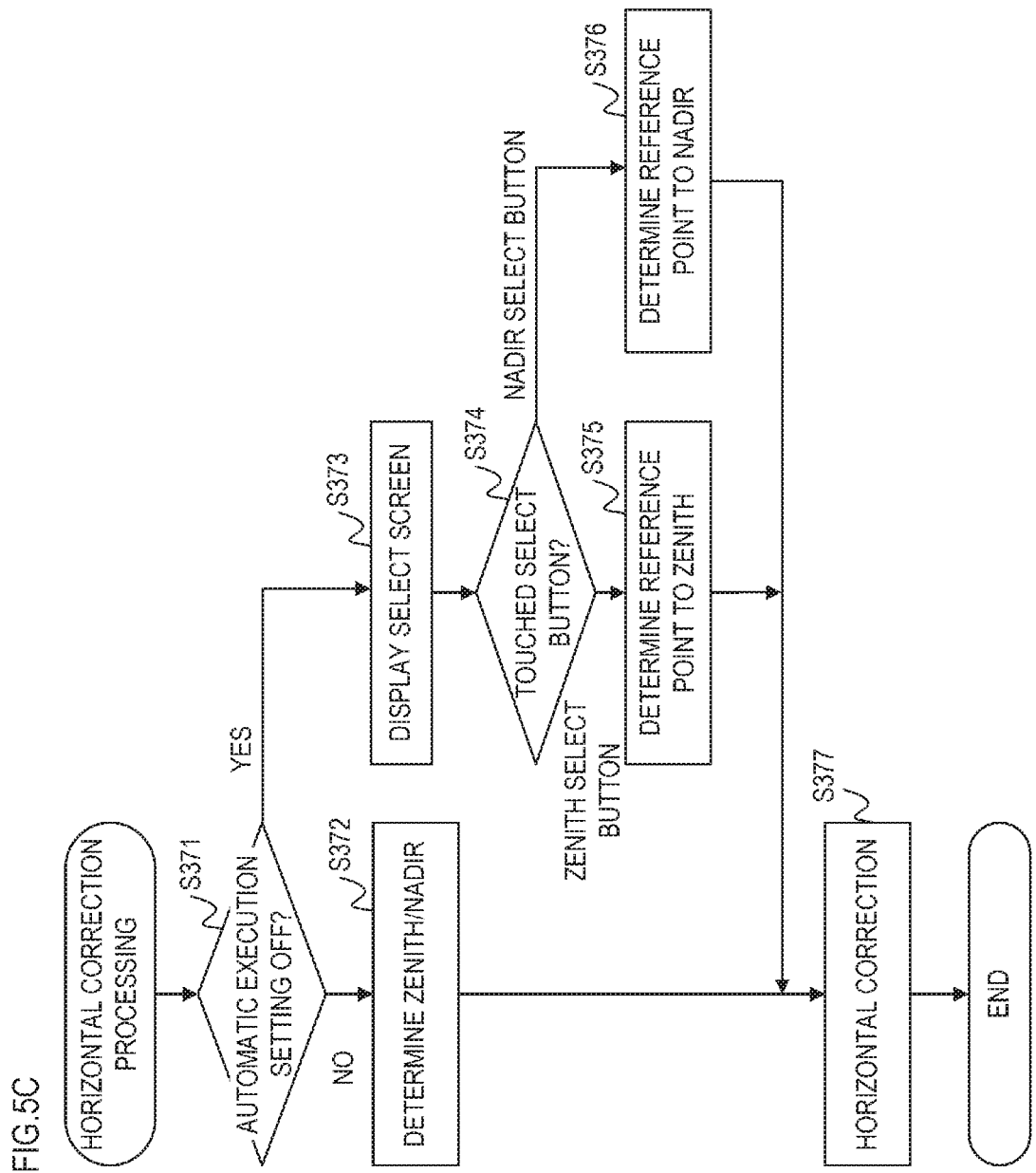

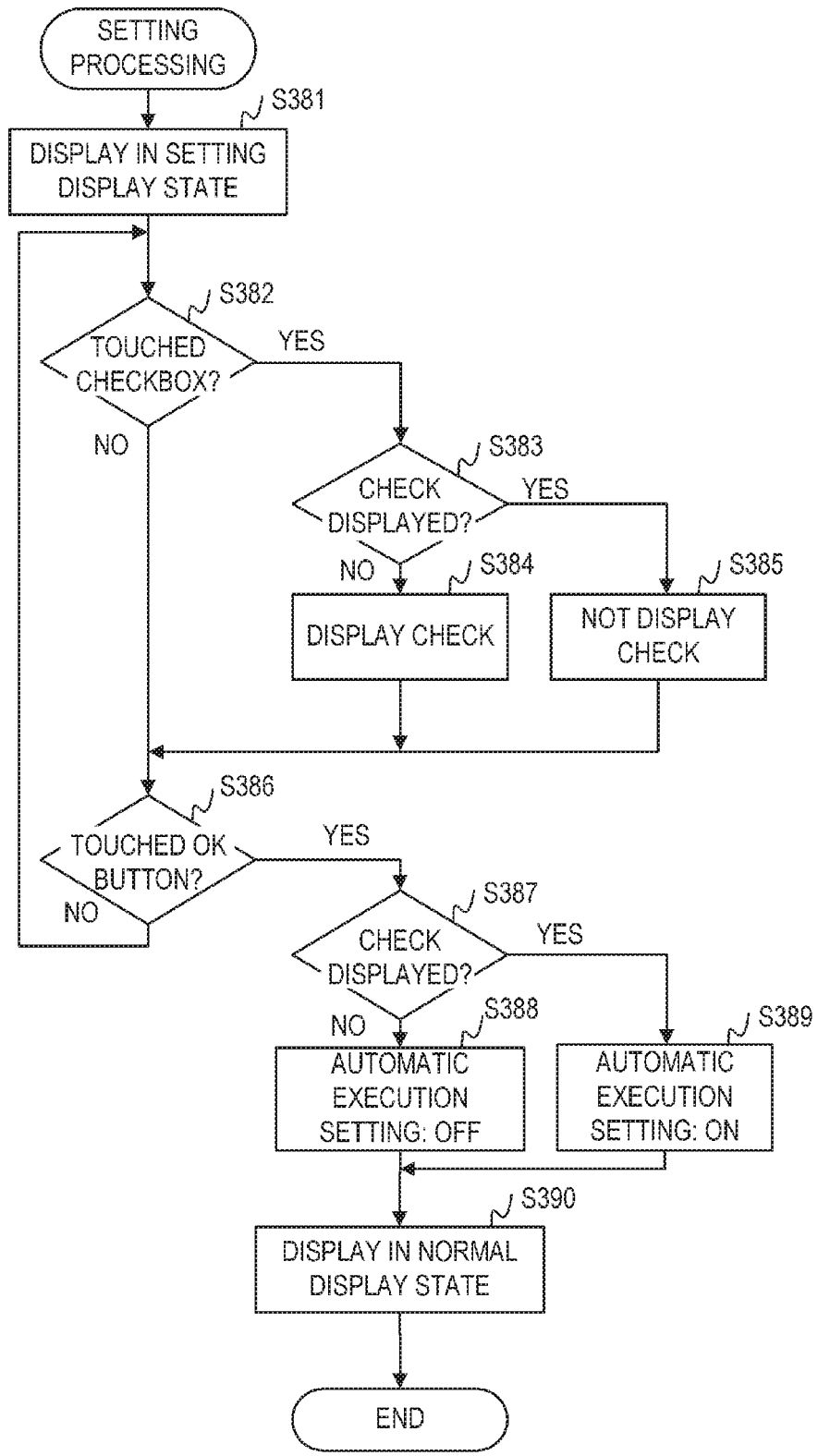

ELECTRONIC APPARATUS FOR DETERMINING ZENITH OR NADIR OF VR IMAGE, CONTROL METHOD OF ELECTRONIC APPARATUS AND NON-TRANSITORY COMPUTER READABLE MEDIUM

BACKGROUND OF THE INVENTION

Field of the Invention

The present invention relates to an electronic apparatus for controlling display of images, a control method of the electronic apparatus, and a non-transitory computer readable medium.

Description of the Related Art

In recent years, imaging apparatuses that can capture images in a range wider than the human view angle, such as omnidirectional images or spherical images (VR images), are becoming popular. A method of displaying a part of an image having a wide range on a screen of a display apparatus, and changing the range of the image displayed on the screen (display range) so as to follow the change of the posture of the display apparatus, in order to implement a display having a high sense of immersion and realistic sensation (VR view), is also known.

In a VR image, if the zenith and the nadir are determined, for example, a horizontal plane of the VR image can be determined based on the axis connecting these two points. If the center of the VR image is predetermined, the horizontal plane can be determined based on either the zenith or the nadir. When the horizontal plane is appropriately determined, the horizontal line captured in an image can be linearly adjusted, and the image can be corrected to be displayed in parallel with the horizontal direction on the screen, hence the captured object can be appropriately reproduced on the display. In other words, visibility of the image can be improved when the user reproduces the image.

Further, a horizontal correction, which corrects the horizontal plane (information on the horizontal plane) in accordance with the posture of image capturing, inclination of the image-capturing device and the like, has been performed. Japanese Patent Application Publication No. 2018-129720 discloses a technique to perform the horizontal correction by accurately performing the projective transformation on a VR image captured while the image-capturing apparatus is changing locations or moving.

However, in the case of Japanese Patent Application Publication No. 2018-129720, the horizontal correction is performed based on the acceleration and angular velocity of the image-capturing apparatus during the image capture, hence the horizontal correction cannot be performed if this information is not acquired during image capturing. In such a case, even if the user attempts to specify the zenith and the nadir for horizontal correction, this specification is difficult because the horizontal line to be the reference is considerably curved when the VR image is partially displayed or developed onto a plane. In other words, in the prior art, the zenith and the nadir in the VR image cannot be easily determined by the user operation.

SUMMARY OF THE INVENTION

The present invention provides for easily determining the zenith and the nadir of the VR image by the user operation.

A first aspect of the invention of the present disclosure is:
an electronic apparatus, comprising:
a memory and at least one processor and/or at least one circuit to perform the operations of the following units:
a control unit configured to:
1) display, in a display area, at least a part including a reference point out of a VR image expressed by a projection format using a predetermined point as the reference point, and
2) change the reference point in case an instruction is received from a user; and
a determination unit configured to determine the reference point as a zenith or a nadir of the VR image.

A second aspect of the invention of the present disclosure is:
a control method of an electronic apparatus, comprising:
a control step of 1) displaying, in a display area, at least a part including a reference point out of a VR image expressed by a projection format using a predetermined point as the reference point, and 2) changing the reference point in case an instruction is received from a user; and
a determination step of determining the reference point as a zenith or a nadir of the VR image.

Further features of the present invention will become apparent from the following description of exemplary embodiments with reference to the attached drawings.

BRIEF DESCRIPTION OF THE DRAWINGS

FIG. 4 is a flow chart depicting an image reproduction processing according to the embodiment;

FIGS. 5A to 5C are flow charts depicting details of the image reproduction processing according to the embodiment;

FIG. 6 is a flow chart depicting a setting processing according to the embodiment:

DESCRIPTION OF THE EMBODIMENTS

An embodiment of the present invention will be described with reference to the drawings.

Embodiment

In this embodiment, out of a VR image expressed by a projection format using a predetermined point as a reference point, an electronic apparatus displays at least a part, which includes the reference point, on a predetermined display area. When an instruction is received by the user, the electronic apparatus changes the position of the VR image indicated by the reference point by changing the position of the reference point of the VR image. Thereby the image displayed in the predetermined display area changes. If the reference point displayed in the predetermined display area indicates the zenith or the nadir of the VR image, the VR image is displayed in the predetermined display area, such that the actual horizontal line (horizon) of the VR image extends circularly with the reference point as the center. The electronic apparatus determines whether the reference point of the VR image indicates the zenith or the nadir by the user operation, for example. Therefore, the zenith or the nadir of the VR image can be easily determined by the user operation.

External View of Digital Camera

Figure 1A:
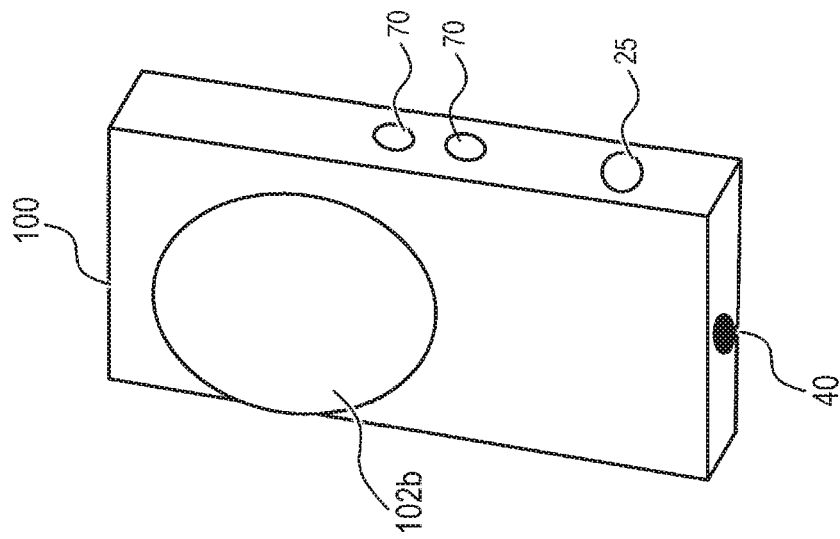
FIGS. 1A and 1B are external views of a digital camera according to an embodiment.
Figure 1B:
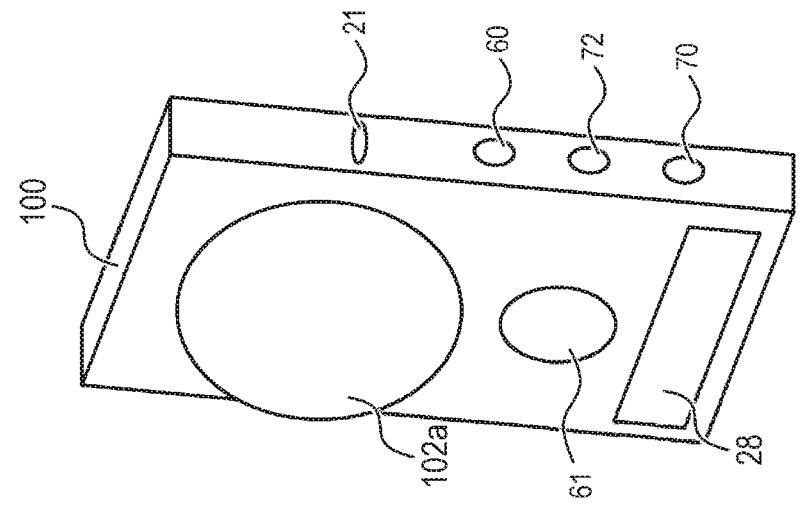

A digital camera 100, which is an apparatus for capturing a VR image, will be described first. FIG. 1A is a front perspective view (external view) of the digital camera 100 (imaging apparatus) which is the electronic apparatus. FIG. 1B is a rear perspective view (external view) of the digital camera 100. The digital camera 100 is an omnidirectional camera (spherical camera).

In this embodiment, it is assumed that the digital camera 100 is constituted of a camera unit a and a camera unit b of which image-capturing ranges are different from each other. Here the camera unit a is a wide angle camera of which image-capturing range is at least 180° horizontally and vertically on the front side of the digital camera 100. The camera unit b is a wide angle camera of which image-capturing range is at least 180° horizontally and vertically on the rear side of the digital camera 100.

A barrier 102a is a protective window of an image-capturing lens 103a for the camera unit a of which image-capturing range is a front area of the digital camera 100. The barrier 102a may be an outer surface of the image-capturing lens 103a. A barrier 102b is a protective window of an image-capturing lens 103b for the camera unit b of which image-capturing range is a rear area of the digital camera 100. The barrier 102b may be an outer surface of the image-capturing lens 103b.

A display unit 28 is a display unit to display various information. A shutter button 61 is an operation unit to instruct image capturing. A mode-selecting switch 60 is an operation unit to switch various modes. A connection interface (I/F) 25 is a connector to connect a connection cable to the digital camera 100, whereby the digital camera 100 is connected to an external apparatus (e.g. smartphone, personal computer, TV). An operation unit 70 is an operation unit constituted of operation members (e.g. various switches, buttons, dials, touch sensors) to receive various operations from the user. A power switch 72 is a push button to switch the power supply ON/OFF.

A light-emitting unit 21 is a light-emitting member (e.g. a light-emitting diode (LED)) that notifies the user on various states of the digital camera 10) using light-emitting patterns and light-emitting colors. A fixing unit 40 is a screw hole for a tripod, for example, and is used to install and fix the digital camera 100 to a fixture (e.g. tripod).

Configuration of Digital Camera

Figure 2:
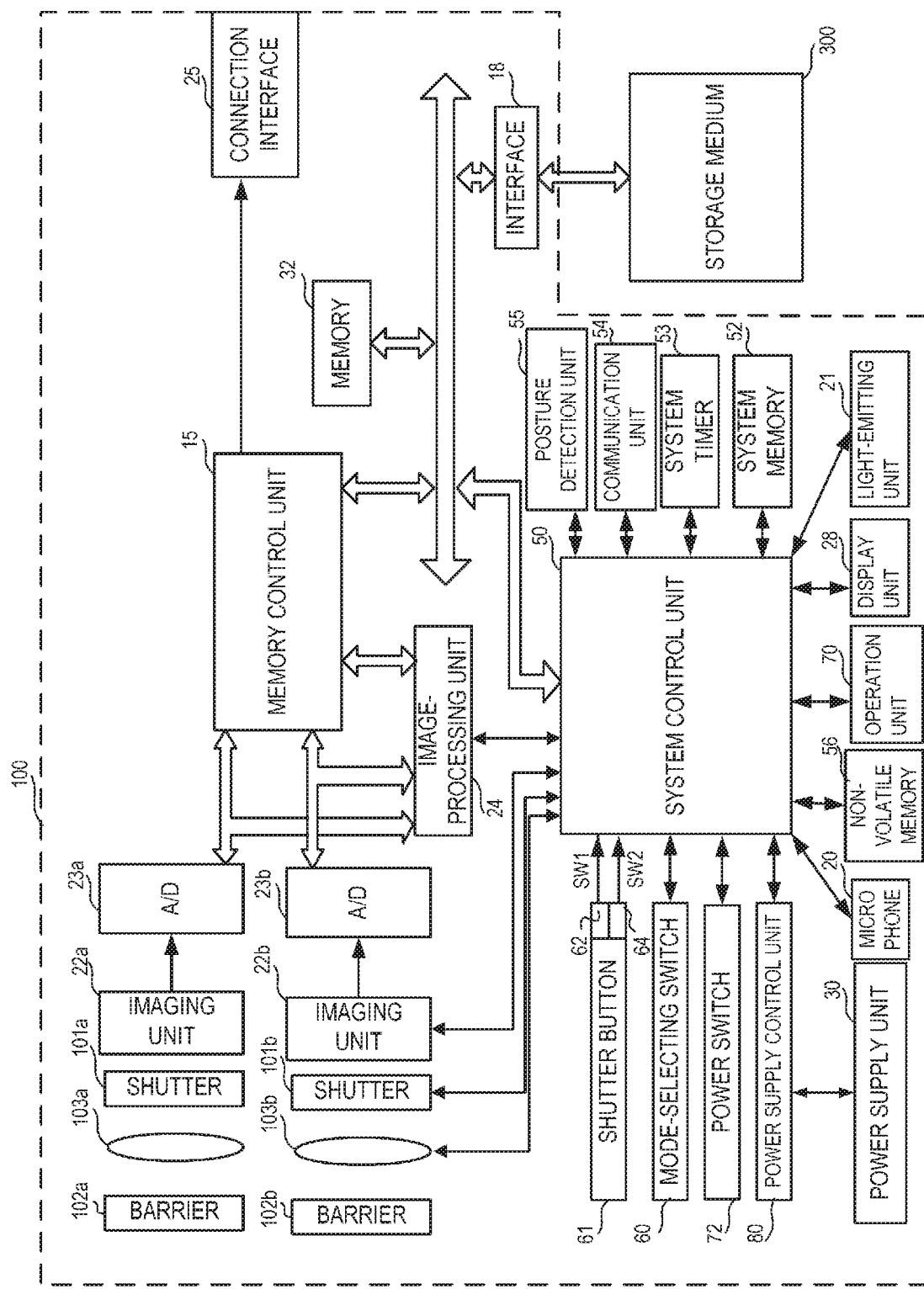
FIG. 2 is a block diagram of the digital camera according to the embodiment.

FIG. 2 is a block diagram depicting a configuration example of the digital camera 100.

The barrier 102a covers an imaging system of the camera unit a, including the image-capturing lens 103a, of the digital camera 100, so as to prevent contamination of and damage to the imaging system, including the image-capturing lens 103a, a shutter 101a and an imaging unit 22a.

The image-capturing lens 103a is a lens group including a zoom lens and a focus lens, and is a wide angle lens. The shutter 101a is a shutter which has an aperture function to adjust the incident amount of the object light to the imaging unit 22a. The imaging unit 22a is an image pickup element constituted of a CCD, a CMOS element or the like, to convert an optical image into an electric signal. An A/D convertor 23a converts an analog signal output from the imaging unit 22a into a digital signal.

The barrier 102b covers an imaging system of the camera unit b, including the image-capturing lens 103b, of the digital camera 100, so as to prevent contamination of and damage to the imaging system, including the image-capturing lens 103b, a shutter 101b, and an imaging unit 22b.

The image-capturing lens 103b is a lens group including a zoom lens and a focus lens, and is a wide angle lens. The shutter 101b is a shutter which has an aperture function to adjust the incident amount of the object light to the imaging unit 22b. The imaging unit 22b is an image pickup element constituted of a CCD, a CMOS element or the like, to convert an optical image into an electric signal. An A/D convertor 23b converts an analog signal output from the imaging unit 22b into a digital signal.

A VR image is captured by the imaging unit 22a and the imaging unit 22b. The VR image is an image that can be VR-displayed. The VR image includes an omnidirectional image (spherical images) captured by an omnidirectional camera (spherical camera), and a panoramic image having an image range (effective image range) that is wider than the possible display range of the display unit. The VR image includes not only a still image, but also a moving image and a live view image (image acquired from the camera in near real-time). The VR image has an image range (effective image range) equivalent to the visual field that is at most 360° in the vertical direction (vertical angle, angle from the zenith, evaluation angle, depression angle, altitude angle), and 360° in the horizontal direction (horizontal angle, azimuth angle). The VR image includes an image that has a view angle (visual field range) wider than the view angle that a standard camera can capture, even if the angle is less than 360° vertically and 360° horizontally, or an image that has an image range (effective image range) wider than a possible display range of the display unit.

For example, an image captured by an omnidirectional camera that can capture an image of an object in a visual field (view angle) that is 360° horizontally (horizontal angle, azimuth angle), and 210° vertically with the zenith at the center, is a type of VR image. Further, an image captured by a camera that can capture an image of an object in a visual field (view angle) that is 180° horizontally (horizontal angle, azimuth angle) and 180° vertically with the horizontal direction at the center, is a type of VR image. In other words, an image which has an image range of a visual field that is at least 160° (±80°) in the vertical direction and horizontal direction respectively, and which has an image range that is wider than a range that an individual can visually recognize at once, is a type of VR image. When this VR image is VR-displayed (displayed in display move "VR view"), a seamless omnidirectional image can be viewed in the horizontal direction (horizontally rotating direction) by changing the posture of the display apparatus in the horizontally rotating direction. In terms of the vertical direction (vertically rotating direction), a seamless omnidirectional image can be viewed in the ±105° range from the above (zenith), but the range that exceeds 105° from the zenith becomes a blank region where no image exists. The VR image can be defined as "an image of which image range is at least a part of a virtual space (VR space)".

The VR display (VR view) is a display method (display mode) which can change the display range, to display an image in the visual field range in accordance with the posture of the display apparatus, out of the VR image. To view the image while wearing a head mount display (HMD), which is a display apparatus, an image in the visual field in accordance with the orientation of the face of the user is displayed. For example, it is assumed that an image in the visual angle (view angle) centered at 0° in the horizontal direction (specific azimuth, such as North) and 90° in the vertical direction (90° from the zenith, that is the horizontal direction) out of the VR image, is displayed at a certain timing. If the posture of the display apparatus is front/back inverted (e.g. display surface is changed from facing South to facing North), the display range is changed to an image in the visual angle centered at 180° in the horizontal direction (opposite azimuth, such as South), and 90° in the vertical direction (horizontal direction) out of the same VR image. In the case where the user views the image while wearing an HMD, the image displayed on the HMD changes from an image to the North to an image to the South if the user turns their face from North to South (in other words, if the user turns back). By this VR display, the user can visually experience the sensation as if they are actually at the spot of the VR image (VR space). A smartphone mounted on the VR goggles (head mount adapter) can be regarded as a type of HMD. The method of displaying the VR image is not limited to the above description, and the display range may be moved (scrolled) in accordance with the user operation on a touch panel, a direction button or the like, instead of by changing the posture. When the VR image is displayed in the VR display mode (VR view mode), the display range may be changed not only by changing the posture, but also by a touch move operation on the touch panel or a drag operation using an operation member (e.g. mouse).

An image-processing unit 24 performs a predetermined processing, such as pixel interpolation, resizing (e.g. zoom out) and color conversion, on the data from the AD convertor 23a and the A/D convertor 23b, or the data from the memory control unit 15. The image-processing unit 24 also performs a predetermined arithmetic processing using captured image data. A system control unit 50 performs exposure control and distance measurement control based on the arithmetic result acquired by the image-processing unit 24. Thereby the through-the-lens (TTL) type auto focus (AF) processing, auto exposure (AE) processing and pre-flash emission (EF) processing are performed. The image-processing unit 24 also performs a predetermined arithmetic processing using the captured image data, and performs TTL type auto white balance (AWB) processing based on the acquired arithmetic result.

Further, the image-processing unit 24 performs basic image-processing on the two images (fisheye images) acquired from the AD convertor 23a and the A/D convertor 23b, and connects the images (image connection processing) so as to generate a single VR image. In the image connection processing to connect the two images, for each of the two images, the image-processing unit 24 calculates the amount of deviation between the reference image and the comparative image for each area by pattern matching processing, and detects a connection position. Then considering the detected connection position and the lens characteristic of each optical system, the image-processing unit 24 corrects the distortion of each of the two images by the geometric conversion, so as to convert each image into an image in an omnidirectional image format. By blending these two images in the omnidirectional image format, the image-processing unit 24 generates one omnidirectional image (VR image). The generated omnidirectional image (VR image) is an image based on the equirectangular projection, and the position of each pixel can be corresponded to the coordinates on the surface of a sphere. When the VR image is displayed in live view or reproduced, the image-processing unit 24 performs image extraction processing, zooming processing, distortion correction and the like, to VR-display the VR image, and also performs rendering to draw the VR image in the VRAM of the memory 32.

The output data from the A/D convertors 23 are written in the memory 32 via the image-processing unit 24 and the memory control unit 15, or via the memory control unit 15 alone. The memory 32 stores image data, which is acquired by the imaging units 22 and converted into digital data by the A/D convertors 23, and image data that is output to an external display via the connection I/F 25. The memory 32 has a storage capacity that is sufficient to store a predetermined number of still images, or a predetermine time of moving images and sound data.

The memory 32 also functions as a memory for image display (video memory). The data for image display, which is stored in the memory 32, can be output to an external display via the connection I/F 25. If the VR images, which were captured by the imaging units 22a and 22b, generated by the image-processing unit 24 and accumulated in the memory 32, are sequentially transferred and displayed on an external display, this display camera 100 can function as an electronic view finder and perform live view display (LV display). Hereafter the image displayed by the live view display is called the "LV image". Further, to perform the live view display (remote LV display), the VR images accumulated in the memory 32 may be transferred to a wirelessly-connected external apparatus (e.g. smartphone) via the communication unit 54, and displayed on the external apparatus side.

A non-volatile memory 56 is a memory that functions as an electrically erasable and recordable recording medium, such as an EEPROM. In the non-volatile memory 56, constants, programs and the like, for operation of a system control unit 50 are stored.

The system control unit 50 is a control unit that includes at least one processor or circuit, and controls the digital camera 100 in general. The system control unit 50 implements each later mentioned processing of this embodiment by executing a program recorded in the above mentioned non-volatile memory 56. The system memory 52 is a RAM, for example. In the system memory 52, constants and variables for the operation of the system control unit 50, and programs read from the non-volatile memory 56, are developed. The system control unit 50 also controls display by controlling the memory 32, the image-processing unit 24 and the memory control unit 15.

A system timer 53 is a timer that measures the time used for various controls and the time of internal clocks.

The mode-selecting switch 60, the shutter button 61 and the operation unit 70 are operation members to input various operation instructions to the system control unit 50. The mode-selecting switch 60 switches the operation mode of the system control unit 50 to one of a still image recording mode, a moving image-capturing mode, a reproduction mode, a communication connection mode and the like. The still image recording mode includes an auto image-capturing mode, an auto scene determination mode, a manual mode, an aperture priority mode (Av mode), a shutter speed priority mode (Tv mode) and a program AE mode. Various scene modes, to perform image-capturing settings for each image-capturing scene, and a custom mode, are also included. The user can directly select one of these modes using the mode-selecting switch 60. The user may select an image-capturing mode list screen first using the mode-selecting switch 60, then may select one of the plurality of modes displayed on the display unit 28 using another operation member. The moving image-capturing mode may include a plurality of modes in the same manner.

A first shutter switch 62 is turned ON in the middle of the operation, that is, in the half-depressed state (image capturing preparation instruction) of the shutter button 61 disposed in the digital camera 100, and generates a first shutter switch signal SW1. With the first shutter switch signal SW1, the image capturing preparation operation, such as the auto focus (AF) processing, the auto exposure (AE) processing, the auto white balance (AWB) processing and the pre-flash emission (EF) processing start.

A second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing from reading the signals from the imaging units 22 to writing the image data to a storage medium 300.

The shutter button 61 is not limited to an operation member that can perform the two-step operation (half-depression and full-depression), but may be an operation member that can perform only a one-step operation. In this case, the image capturing preparation operation and the image capturing processing are performed continuously by a one-step depression. This is the same as the case of fully depressing the shutter button that can perform both half-depression and full-depression (case where signals SW1 and SW2 are generated almost simultaneously).

Each operation member of the operation unit 70 functions as various functional buttons that perform the functions assigned for each scene, by selecting various functional icons and options displayed on the display unit 28. The functional buttons include: an end button, a return button, an image forward button, a jump button, a preview button and an attribute change button. For example, when the menu button is depressed, a menu screen, that allows various settings, is displayed on the display unit 28. The user operates the operation unit 70 while viewing the menu screen displayed on the display unit 28, whereby various settings can be performed intuitively.

A power supply control unit 80 includes a battery detection circuit, a DC-DC convertor, and a switch circuit to select a block to be energized, so as to detect whether the battery is installed, a type of battery and a residual amount of battery power. The power supply control unit 80 also controls the DC-DC convertor based on the detection result and the instructions of the system control unit 50, and supplies the required voltage to each component, including the storage medium 300, for a required period of time. A power supply unit 30 includes: a primary battery (e.g. alkali battery, lithium battery), a secondary battery (e.g. NiCd battery, NiMH battery, Li battery), and an AC adapter.

A recording medium I/F 18 is an interface with a storage medium 300 (e.g. memory card, hard disk). The storage medium 300 is a recording medium (storage medium), such as a memory card, to record captured images, and is constituted of a semiconductor memory, an optical disk, a magnetic disk and the like. The storage medium 300 may be an exchangeable recording medium that is detachable from the digital camera 100, or may be a recording medium (storage medium) embedded in the digital camera 100.

A communication unit 54 is connected wirelessly or via cable, and transmits/receives image signals and sound signals. The communication unit 54 can also be connected to a wireless local area network (LAN) or the Internet. The communication unit 54 can transmit images captured by the imaging units 22a and 22b (including LV images) or images recorded in the storage medium 300, and can receive images and various other information from an external apparatus.

A posture detection unit 55 detects a posture of the digital camera 100 with respect to the direction of gravity. Based on the posture detected by the posture detection unit 55, it can be determined whether the images captured by the imaging units 22 are images captured when the digital camera 100 is held in the horizontal position, or images captured when the digital camera 100 is held in the vertical position. It can also be determined to what degree the digital camera 100 was inclined in the three axis directions (yaw, pitch and roll directions) when the images were captured. The system control unit 50 can add the orientation information in accordance with the posture detected by the posture detection unit 55 to the image file of the VR image captured by the imaging units 22a and 22b, or can rotate the image (adjust the orientation of the images so as to correct the inclination) and record the rotated image. For the posture detection unit 55, at least one of the acceleration sensor, gyro sensor, geo-magnetic sensor, azimuth sensor, altitude sensor and the like may be used. Using the acceleration sensor, gyro sensor and azimuth sensor, the posture detection unit 55 can also detect the movement of the digital camera 100 (e.g. pan, tile, elevate, still).

A microphone 20 is a microphone that collects sound around the digital camera 100, that is recorded as sound of the moving image of the VR image. A connection I/F 25 is a connection plug to which an HDMI® cable, USB cable or the like is connected, so as to transmit or receive images to/from an external apparatus.

External View of Display Control Apparatus

Figure 3A:
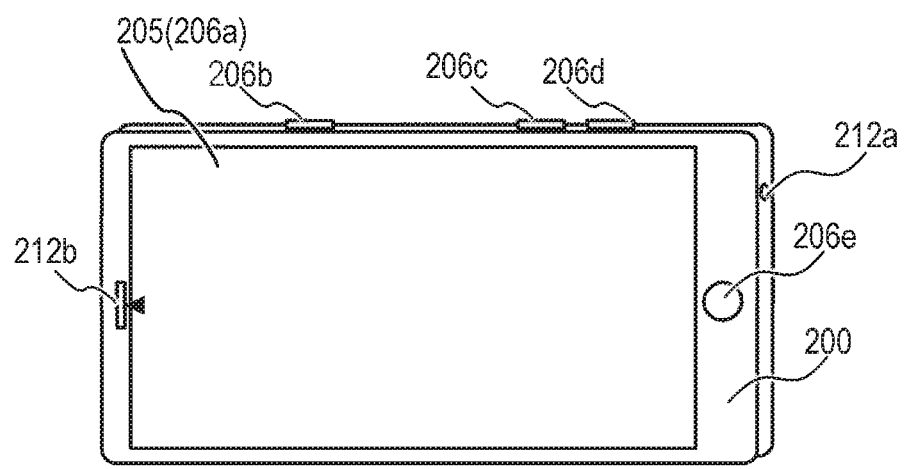
FIGS. 3A to 3C are diagrams for explaining a display control apparatus according to the embodiment.

A display control apparatus 200, which is an apparatus to reproduce a VR image, will be described next. FIG. 3A is an external view of an example of the display control apparatus 200, which is a type of electronic apparatus. A display 205 is a display unit that displays images and various information. The display 205 is integrated with a touch panel 206a, so that the touch operation on the display surface of the display 205 can be detected. The display control apparatus 200 can VR-display a VR image (VR content) on the display 205. An operation unit 206 includes a touch panel 206a and operation units 206b, 206c, 206d and 206e, as illustrated in FIG. 3A.

The operation unit 206b is a power button which receives operation to switch ON/OFF of the power supply of the display control apparatus 200. The operation unit 206c and the operation unit 206d are volume buttons for increasing/decreasing the volume of the sound that is output from a sound output unit 212. The operation unit 206e is a home button for displaying a home screen on the display 205. The sound output terminal 212a is an earphone jack, which is a terminal for outputting sound signals to an earphone, an external speaker or the like. The speaker 212b is a built-in speaker for outputting sound.

Configuration of Display Control Apparatus

Figure 3B:
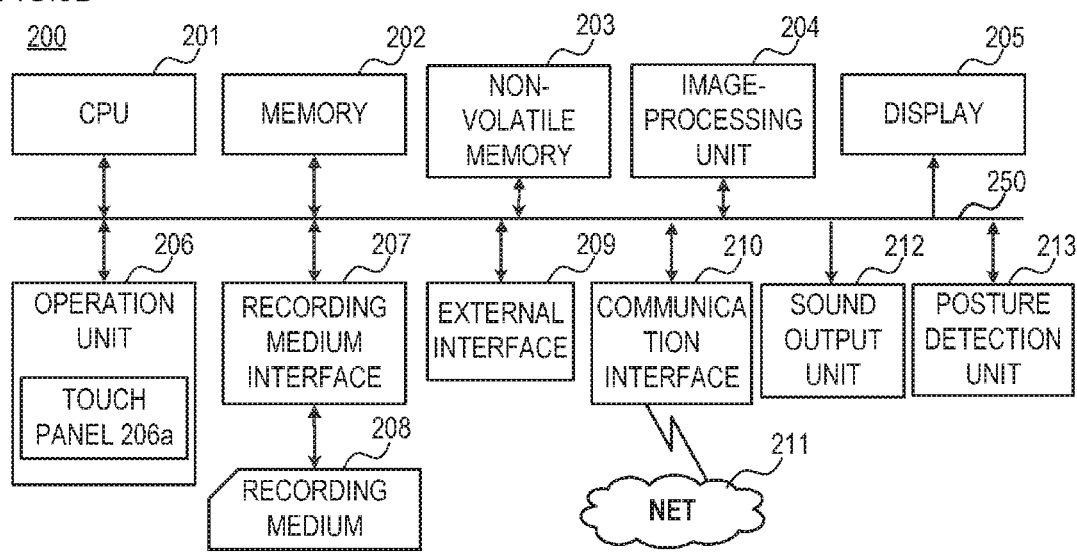

FIG. 3B is a block diagram depicting an example of a configuration of the display control apparatus 200. The display control apparatus 200 can be configured using such a display apparatus as a smartphone. A CPU 201, a memory 202, a non-volatile memory 203, an image-processing unit 204, a display 205, an operation unit 206, a storage medium I/F 207, an external I/F 209 and a communication I/F 210 are connected to an internal bus 250. A sound output unit 212 and a posture detection unit 213 are also connected to the internal bus 250. Each unit connected to the internal bus 250 is configured such that data can be exchanged with other units via the internal bus 250.

The CPU 201 is a control unit that controls the display control apparatus 200 in general, and includes at least one processor or circuit. The memory 202 is a RAM (e.g. volatile memory using a semiconductor element). The CPU 201 controls each unit of the display control apparatus 200 using the memory 202 as a work memory, in accordance with the program stored in the non-volatile memory 203, for example. The non-volatile memory 203 stores such data as image data and sound data, and various programs for the CPU 201 to operate. The non-volatile memory 203 is a flash memory or a ROM, for example.

The image-processing unit 204 performs various image processing on the images stored in the non-volatile memory 203 and the storage medium 208, the image signals acquired via the external I/F 209, the images acquired via the communication I/F 210 and the like, based on the control of the CPU 201. The image processing performed by the image-processing unit 204 include: an A/D conversion processing, D/A conversion processing, encoding processing of image data, compression processing, decoding processing, zooming processing (resizing), noise reduction processing and color conversion processing. The image-processing unit 204 also performs various image processing (e.g. panoramic development, mapping processing, conversion) on a VR image, which is an omnidirectional image or a wide angle image, which is not an omnidirectional image but an image having data in a wide range. The image-processing unit 204 may be configured by dedicated circuit blocks to perform a specific image processing. Depending on the type of image processing, the CPU 201 may perform the image processing in accordance with a program, without using the image-processing unit 204.

The display 205 displays images and a graphical user interface (GUI) screen based on the control of the CPU 201. The CPU 201 generates display control signals in accordance with the program, and controls each unit of the display control apparatus 200, so as to generate image signals to display the images on the display 205 and output the image signals to the display 205. Based on the output image signals, the display 205 displays the image. The display control apparatus 200 may include only the configuration up to the interface to output the image signals for the display 205 to display the images, and the display 205 may be an external monitor (e.g. TV).

The operation unit 206 is an input device to receive user operation, which includes a text information input device (e.g. keyboard), a pointing device (e.g. mouse, touch panel), buttons, dials, joystick, a touch sensor and a touch pad. The touch panel is an input device which is configured as a plane superimposed on the display 205, so that the coordinate information corresponding to the contacted position is output.

A storage medium 208 (e.g. memory card, CD, DVD) can be attached to the storage medium I/F 207, and based on the control of the CPU 201, the storage medium I/F 207 reads data from the attached storage medium 208 or written data to the storage medium 208. The external I/F 209 is an interface that is connected with an external apparatus via wirelessly or cable, and inputs/outputs image signals and sound signals. The communication I/F 210 is an interface to transmit/receive various data including files and commands, by communicating with an external apparatus via the Internet 211 or the like.

The sound output unit 212 outputs the sound of a moving image or music data, operation tones, ring tones, various notification tones and the like. The sound output unit 212 includes the sound output terminal 212a to connect an earphone and the like, and the speaker 212b, but the sound may be output via wireless communication or the like.

The posture detection unit 213 detects the posture of the display control apparatus 200 with respect to the direction of gravity, and the inclination of the posture of the display control apparatus 200 with respect to each axis of yaw, roll and pitch directions. Based on the posture detected by the posture detection unit 213, it can be determined whether the display control apparatus 200 is held horizontally or vertically, and whether the display control apparatus 200 turns up or down or in a diagonal posture. For the posture detection unit 213, at least one of the acceleration sensor, gyro sensor, geo-magnetic sensor, azimuth sensor, altitude sensor and the like can be used, or a combination of a plurality of sensors thereof may be used.

As mentioned above, the operation unit 206 includes a touch panel 206a The CPU 201 can detect the following operations performed on the touch panel 206a or the states thereof.

a finger or pen which is not touching the touch panel 206a touches the touch panel 206a, that is, touch is started (hereafter Touch-Down)

a finger or pen is touching the touch panel 206a (hereafter Touch-On)

a finger or pen is moving while touching the touch panel 206a (hereafter Touch-Move)

a finger or pen, which is touching the touch panel 206a, is released from the touch panel 206a, that is, touch is ended (hereafter Touch-Up)

Nothing is touching the touch panel 206a (hereafter Touch-Off)

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers and pen is detected.

These operations, states and coordinates of the positions of the finger(s) or pen touching the touch panel 206a are notified to the CPU 201 via the internal bus, and based on the notified information, the CPU 201 determines the kind of operation (touch operation) that was performed on the touch panel 206a. For Touch-Move, the CPU 201 can also determine the moving direction of the finger or pen on the touch panel 206a, based on the change of the positional coordinates, for the vertical components and the horizontal components on the touch panel 206a respectively. If Touch-Move is detected for at least a predetermined distance, the CPU 201 determines that the slide operation was performed. An operation of quickly moving a finger on the touch panel 206a for a certain distance in the touched state and releasing the finger is called "flick". In other words, flick is an operation of touching and moving the finger rapidly on the touch panel 206a. If Touch-Move is detected for at least a predetermined distance at at least a predetermined speed and Touch-Up is detected thereafter, the CPU 201 then determines that flick was performed (determines that flick was performed after the slide operation). Further, a touch operation of touching a plurality of points (e.g. two points) simultaneously and moving these touch positions closer together is called "Pinch-In", and a touch operation of moving these touch positions further apart is called "Pinch-Out". Pinch-In and Pinch-Out are collectively called a pinch operation (or simply "pinch").

For the touch panel 206a, various types of touch panels may be used, such as a resistive film type, a capacitive type, a surface acoustic wave type, an infrared type, an electromagnetic induction type, an image recognition type and an optical sensor type. There is a type of detecting touch when the touch panel is actually contacted, and a type of detecting touch when a finger or pen approaches the touch panel, but either type may be used.

VR Goggles

Figure 3C:
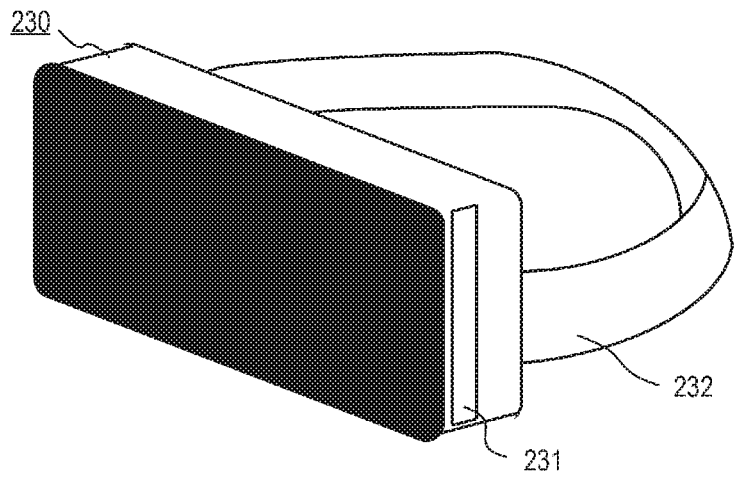

FIG. 3C is an external view of VR goggles (head mount adapter) 230 in which the display control apparatus 200 can be mounted. The display control apparatus 200 can be used as a head mount display by being mounted on the VR goggles 230.

An insertion slot 231 is a slot to insert the display control apparatus 200. The entire display control apparatus 200 can be inserted into the VR goggles 230 such that the display surface of the display 205 faces a head band 232 which secures the VR goggles 230 to the head of the user (that is, faces the user side). By wearing the VR goggles 230 in which the display control apparatus 200 is mounted, the user can view the display 205 din the state of wearing VR goggles 230 on their head, without holding the display control apparatus 200 by hand.

In this case, the posture of the display control apparatus 200 changes if the user moves their head or entire body. The posture detection unit 213 detects the change of the posture of the display control apparatus 200, and the CPU 201 performs the VR display processing based on this change of posture. In this case, the posture detection unit 213 detecting the posture of the display control apparatus 200 is equivalent to detecting the posture of the head of the user (direction in which the line of sight of the user is directed).

Image Reproduction Processing

The image reproduction processing performed by the display control apparatus 200 according to this embodiment will be described next with reference to the flow chart in FIG. 4. When the power button 206b is operated and the power supply is turned ON, the flags, control variables and the like are initialized by the CPU 201, then the processing of this flow chart starts.

Figure 7A:
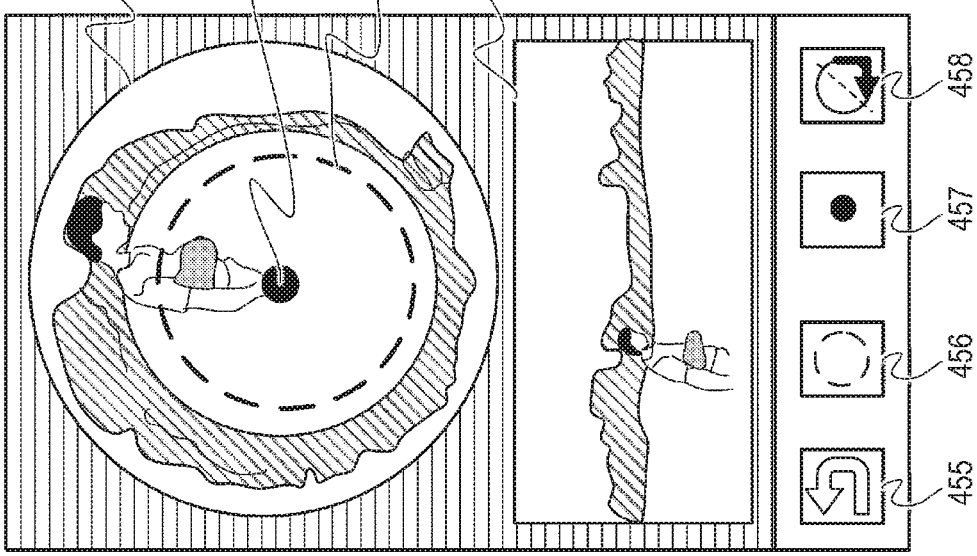
FIGS. 7A and 7B are diagrams depicting display on the display screen according to the embodiment.

In S301, the CPU 201 acquires the image data of the VR image stored in the storage medium 208, and displays the VR image on the display 205, as illustrated in FIG. 7A.

FIG. 7A indicates an example of the image data and operation buttons on the display 205. Here a part of the VR image, in accordance with the posture of the display control apparatus 200, is two-dimensionally developed and displayed in the selected display area 401. In concrete terms, in the selected display area 401, a part of the VR image, of which distortion was corrected in accordance with the information on the horizontal plane that is set, is displayed. Further, an end button 402 to end the image reproduction processing, a horizontal correction button 403 to execute the horizontal correction processing, and a setting button 404 to set (select) the zenith or the nadir are also displayed. The state where the selected display area 401, the end button 402, the horizontal correction button 403 and the setting button 404 are displayed is hereafter called the "normal display state".

In S302, the CPU 201 determines whether the touch operation to the horizontal correction button 403 was performed on the touch panel 206a. Processing advances to S303 if this operation was performed, or to S316 if not.

In S303, the CPU 201 changes the display state of the display 205 from the "normal display state" to the "horizontal correction display state". In the "horizontal correction display state" in this embodiment, display (mirror ball display; little planet display; circular display) is performed by the projection format so that at least a part (e.g. hemispherical portion) of the VR image comes within the circular display range.

Figure 7B:
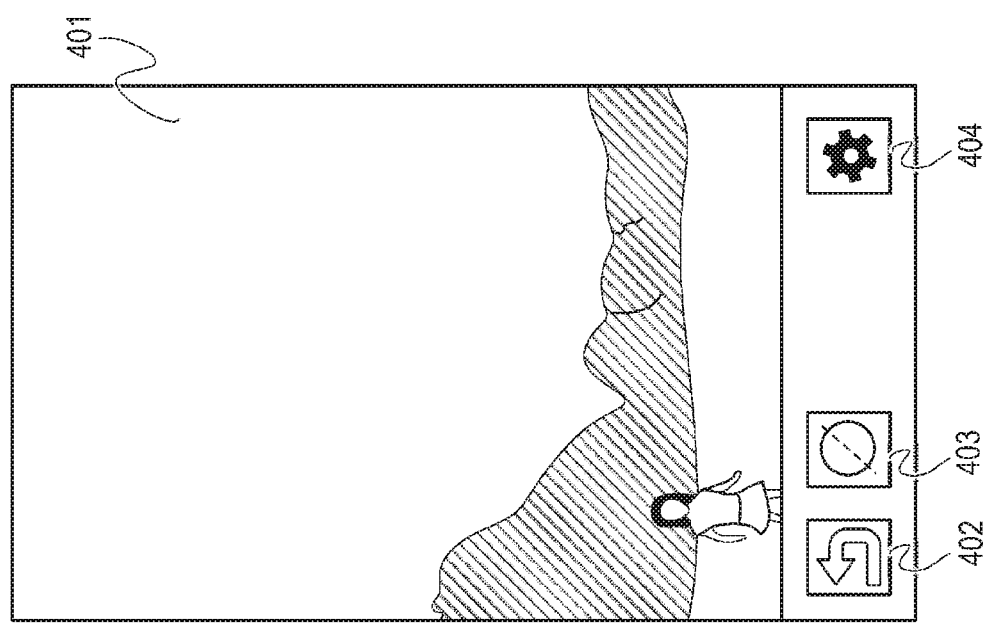

FIG. 7B is an example of the display in the "horizontal correction display state". As illustrated in FIG. 7B, in a mirror ball display area 451, at least a part of the VR image is mirror-ball displayed in a circular shape. In concrete terms, at least a part including a reference point P, out of the VR image expressed by the projection format using a predetermined point as the reference point P, is displayed in the mirror ball display area 451. In this embodiment, the reference point P, displayed in the mirror ball display area 451, is the center position of the display in the mirror ball display area 451. The projection format includes an orthographic projection, an equirectangular projection, cylindrical projection and a cube-map projection, and is a projection format to correctly indicate the azimuth from a certain reference point by drawing the shortest path from the reference point to an arbitrary point to be the direct distance between these two points.

In a preview area 454, a two-dimensionally developed image, after correcting the distortion of the VR image in the range of the mirror display, so that the horizontal line (horizon) becomes a straight line, is displayed. This horizontal line is not an actual horizontal line in the VR image, but a line which the CPU 201 perceives as the horizontal line in the VR image. In other words, if the information on the horizontal surface is corrected in S313, which will be describe later, the CPU 201 performs the distortion correction using this information on the horizontal plane, and if not, the distortion correction is performed based on the information on the horizontal plane which is initially set.

In the preview area 454, a center point 452 and a circle guide 453 may be superimposed and displayed. The center point 452 is a point that indicates a position of the reference point P of the VR image that is displayed in the mirror ball display area 451, and indicates a center position of the mirror ball display area 451 in this embodiment. The circle guide 453 indicates a circular line (broken line) connecting a plurality of positions that is distant from the center point 452 (position of the reference point P) by a predetermined distance. Therefore, the circle guide 453 is a circular line having a radius of a predetermined length (predetermined distance), centered on the position of the reference point. The center point 452 is not limited to a point, but may be any mark that indicates a position (center position) of the reference point P, such as an arrow mark. The circle guide 453 is not limited to a broken line, but may be any line, such as a bold line, a dotted line and a dashed line.

In the "horizontal correction display state", a cancel button 455 to transition to the "normal display state", and a guide switching button 456 to switch display/non-display of the circle guide 453, are displayed on the display 205. Further, a center point switching button 457 to switch display/non-display of the center point 452, and a determination button 458 to determine the execution of the horizontal correction processing, are displayed.

In S304, the CPU 201 determines whether the touch operation to the center point switching button 457 was performed on the touch panel 206a. Processing advances to S305 if this operation was performed, or to S306 if not.

In S305, the CPU 201 performs the center point switching operation, which is a processing to switch display/non-display of the center point 452. The processing in S305 will be described in detail later.

In S306, the CPU 201 determines whether the touch operation to the guide switching button 456 was performed on the touch panel 206a. Processing advances to S307 if this operation was performed, or to S308 if not.

In S307, the CPU 201 performs the guide switching processing, which is a processing to switch display/non-display of the circle guide 453. The processing in S307 will be described in detail later.

In S308, the CPU 201 determines whether the Touch-Move operation to the circle guide 453 was performed on the touch panel 206a. Processing advances to S309 if this operation was performed, or to S310 if not.

In S309, the CPU 201 changes the distance (diameter; predetermined distance; predetermined length) between the circle guide 453 and the center point 452 (reference point P), which is displayed on the display 205, in accordance with the user operation on the touch panel 206a. Thereby the user can display the circle guide 453 in accordance with the position of the object which corresponds to the horizontal plane of the image, and uses this as a guide of operation for correcting the horizontal plane.

In S310, the CPU 201 determines whether the Touch-Move operation to the mirror ball display area 451 was performed on the touch panel 206a. Processing advances to S311 if this operation was performed, or to S312 if not.

In S311, the CPU 201 changes the display of the VR image on the mirror ball display area 451 in accordance with the Touch-Move operation to the mirror ball display area 451. In concrete terms, the CPU 201 changes the display range of the VR image and the display position (arrangement) of each area of the VR image in the mirror ball display area 451 by changing the reference point P displayed in the projection format. If the reference point P (center position) indicates the zenith or the nadir, as mentioned above, the actual horizontal line (horizon) in this display range extends circularly. Therefore, the user changes (determines) the display in the mirror ball display area 451 so that the horizontal line extends circularly, whereby the position of the zenith or the nadir can be easily determined.

In this embodiment, the mirror ball display area 451 itself is circular, hence the user can easily determine whether the horizon extends circularly or not. Further, for the user to determine whether the horizontal line extends circularly, if the above mentioned center point 452 or the circle guide 453 is displayed, the user can determine the position of the zenith or the nadir even more easily since the user can make this determination based on this display.

In the case where the entire area (all) of the VR image is displayed in the mirror ball display area 451, the display range of the VR image is not changed in accordance with the Touch-Move operation, but the arrangement (display position) of each area of the VR image in the mirror ball display area 451 is changed. In S311, the display of the VR image in the mirror ball display area 451 may be changed by an arbitrary instruction from the user using the operation unit 206 (e.g. keyboard, mouse), instead of the Touch-Move operation.

In S312, the CPU 201 determines whether the touch operation to the determination button 458 was performed on the touch panel 206a Processing advances to S313 if this operation was performed, or to S314 if not. Processing may transition to S313 if the user operation is not performed for a predetermined time, for example, instead of being transitioned to S313 by the touch operation by the user.

In S313, the CPU 201 performs the horizontal correction processing, which is a processing to correct the information on the horizontal plane of the VR image. The processing in S313 will be described in detail later.

In S314, the CPU 201 determines whether the touch operation to the cancel button 455 (return button) was performed on the touch panel 206a. Processing advances to S315 if this operation was performed, or to S304 if not.

In S315, the CPU 201 changes the state of the display 205 to the "Normal display state".

In S316, the CPU 201 determines whether the touch operation to the setting button 404 was performed on the touch panel 206a. Processing advances to S317 if this operation was performed, or to S318 if not.

In S317, the CPU 201 performs the setting operation to set whether the zenith/nadir is determined by the user operation. The processing in S317 will be described in detail later.

In S318, the CPU 201 determines whether the touch operation to the end button 402 was performed on the touch panel 206a. The image reproduction processing ends if this operation was performed, or processing returns to S302 if not. The CPU 201 may end the reproduction processing when a predetermined reproduction time of the VR image ends, instead of being based on the Touch operation to the end button 402.

Processing in S305

Figure 5B:
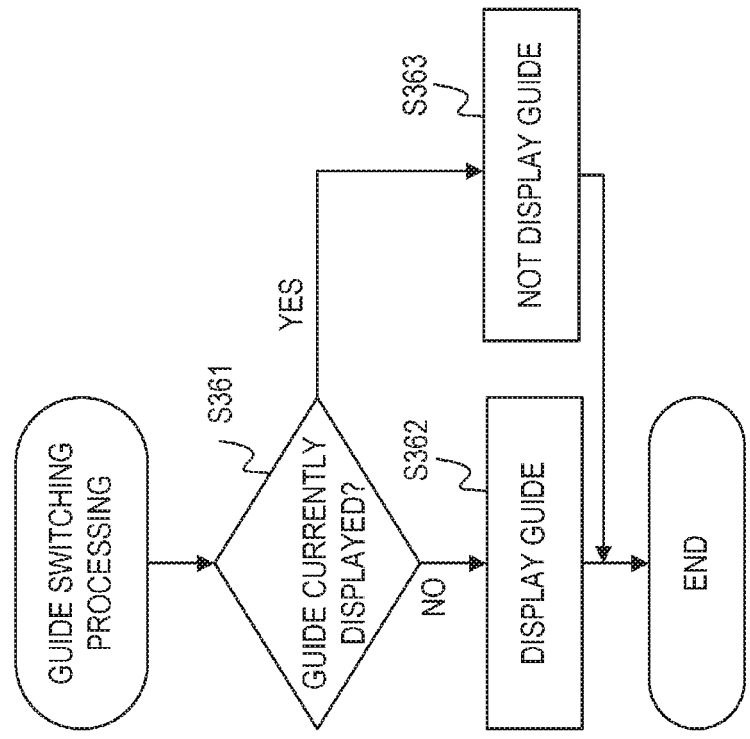
Figure 5A:
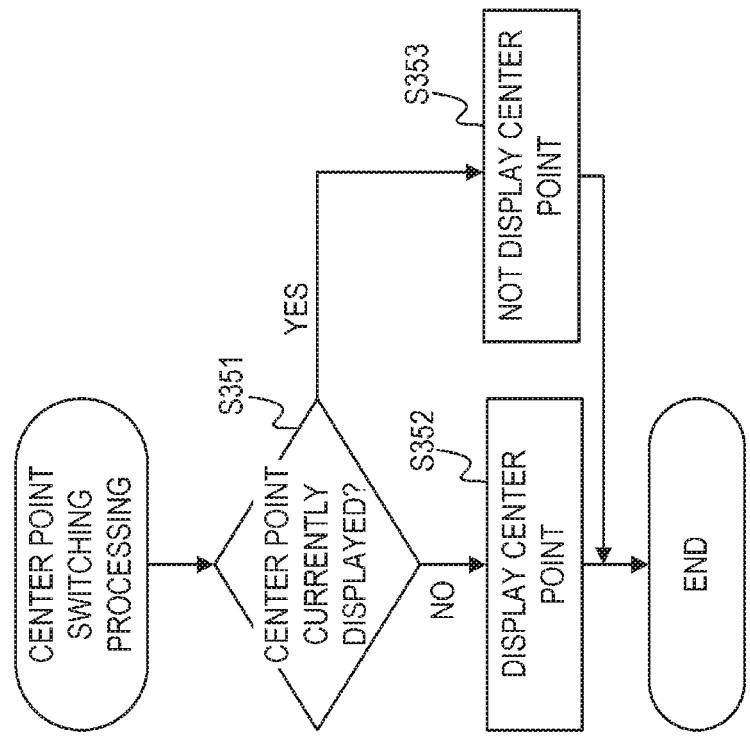

The center point switching processing in S305, which is processing to switch display/non-display of the center point 452, will be described with reference to the flow chart in FIG. 5A. In S351, the CPU 201 determines whether the center point 452 is currently displayed. Processing advances to S353 if the center point 452 is currently displayed, or to S352 if not. In S352, the CPU 201 displays the center point 452 on the display 205. In S353, the CPU 201 does not display the center point 452 on the display 205.

Processing in S307

The guide switching processing in S307, which is processing to switch display/non-display of the circle guide 453, will be described with reference to the flow chart in FIG. 5B. In S361, the CPU 201 determines whether the circle guide 453 is currently displayed. Processing advances to S363 if the circle guide 453 is currently displayed, or to S362 if not. In S362, the CPU 201 displays the circle guide 453 on the display 205. In S363, the CPU 201 does not display the circle guide 453 on the display 205.

Processing in S313

The horizontal correction processing in S313, which is processing to correct the information on the horizontal plane of the VR image, will be described with reference to the flow chart in FIG. 5C.

In S371, the CPU 201 determines whether the later mentioned "Automatic execution setting" of the zenith/nadir selection is ON or OFF. Processing advances to S373 if the "Automatic execution setting" is OFF, or to S372 if ON.

In S372, the CPU 201 determines which one of the zenith and the nadir is indicated by the reference point P (center position) of the VR image (display range). Here the CPU 201 determines which one of the zenith and the nadir is indicated by the reference point P, based on the VR image and the position of the reference point P. For example, if the sun, the moon, the stars and the like exist near the reference point P in a VR image, the CPU 201 determines that the reference point P indicates the zenith. If the ground or the sea surface exists widely around the reference point P of a VR image, the CPU 201 determines that the reference point P indicates the nadir. If an image of an individual is included in a VR image, and the head position of the individual is on the reference point P side, with respect to the feet position of the individual, then the CPU 201 determines that the reference point P indicates the zenith.

Figure 8B:
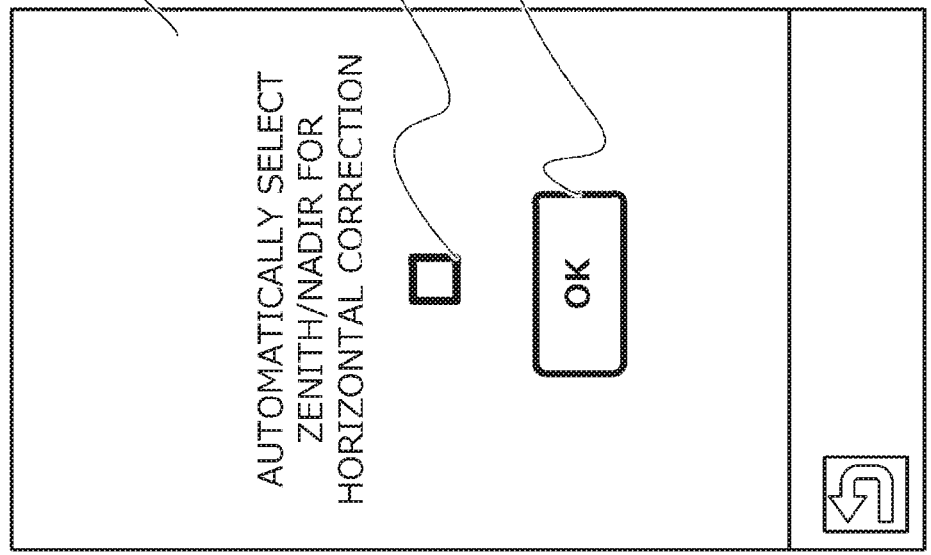
FIGS. 8A and 8B are diagrams depicting display on the display screen according to the embodiment.
Figure 8A:
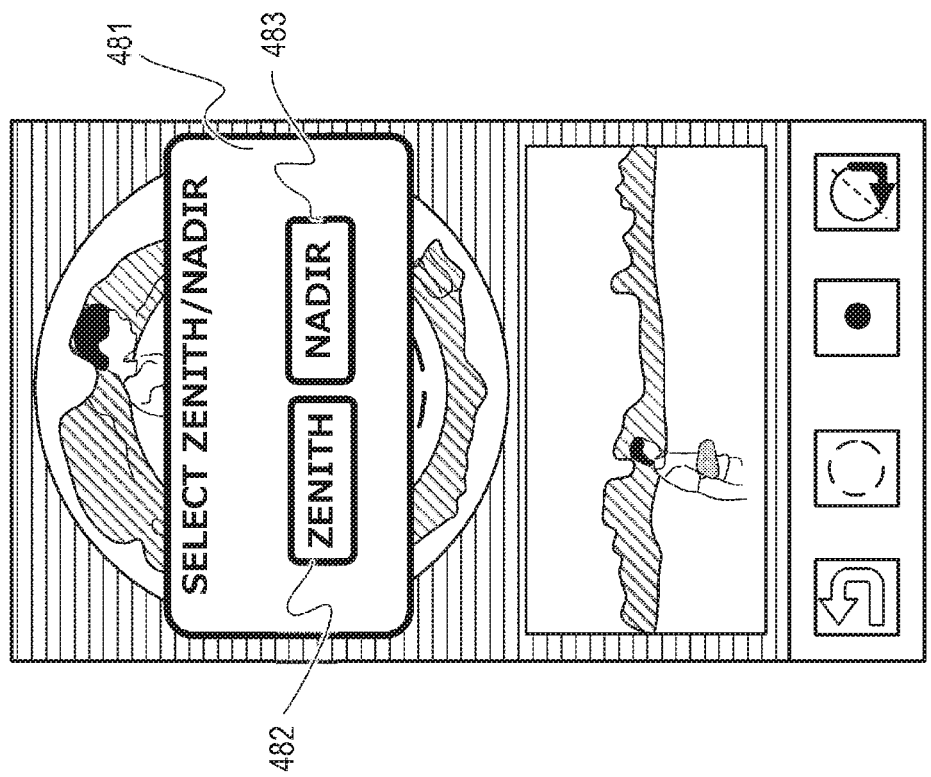

In S373, on the display 205, the CPU 201 displays a select area 481, such as the one shown in FIG. 8A, for the user to select which one of the zenith and the nadir as indicated by the reference point P of the VR image indicates. The select area 481 includes a zenith select button 482 to select that the reference point P of the VR image indicates the zenith, and s nadir select button 483 to select that the reference point P of the VR image indicates the nadir.

In S374, the CPU 201 determines to which one of the zenith select button 482 and the nadir select button 483 the touch operation was performed on the touch panel 206a. Processing advances to S376 if the touch operation was performed to the zenith select button 482, or to S375 if the touch operation was performed to the nadir select button 483. If the user performed the touch operation to neither the zenith select button 482 nor the nadir select button 483 in S374, processing stands by in S374 without transitioning to another step.

In S375, the CPU 201 determines that the reference point P of the VR image indicates the zenith. In S376, the CPU 201 determines that the reference point P of the VR image indicates the nadir.

As described above, in S372 to S376, the CPU 201 determines which one of the zenith and the nadir is indicated by the reference point P of the VR image. Therefore in this embodiment, the CPU 201 can be regarded as a control unit that controls display of the display 205 and the like, and also as a determination unit that determines which one of the zenith and the nadir is indicated by the reference point P of the VR image.

In S377, the CPU 201 controls the image-processing unit 204 in accordance with information on the determined zenith or nadir, and executes the correction of information on the horizontal plane (horizontal correction) on the VR image (image data on the omnidirectional image) stored in the storage medium 208. In other words, in S377, the CPU 201 stores the position of the reference point determined in S375, in association with the VR image, as the zenith after the correction. Or the CPU 201 stores the position of the reference point determined in S376, in association with the VR image, as the nadir after the correction. Therefore, in this embodiment, the image-processing unit 204 can be regarded as a correction unit that corrects information on the horizontal plane.

Processing in S317

The determination processing in S317, to set whether the zenith/nadir is determined by the user operation, will be described with reference to the flow chart in FIG. 6.

In S381, the CPU 201 changes the display on the display 205 from the "normal display state" to the "setting display state", as indicated in FIG. 8B. In the "setting display state", in the setting display area 491, a checkbox 492 for the user to set whether the selection of zenith/nadir is performed by the user operation, and an OK button 493 to reflect the setting in the checkbox 492, are displayed.

In S382, the CPU 201 determines whether the touch operation to the checkbox 492 was performed on the touch panel 206a. Processing advances to S383 if this operation was performed, or to S386 if not.

In S383, the CPU 201 determines whether the checkbox 492 was checked. Processing advances to S385 if checked, or to S384 if not.

In S384, the CPU 201 displays the check in the checkbox 492. In S385, the CPU 201 deletes the check in the checkbox 492.

In S386, the CPU 201 determines whether the touch operation to the OK button 493 was performed on the touch panel 206a. Processing advances to S387 if this operation was performed, or to S382 if not.

In S387, the CPU 201 determines whether the checkbox 492 is checked. Processing advances to S388 if checked, or to S389 if not.

In S388, the CPU 201 performs processing to set the "Automatic execution setting" to OFF. If the "Automatic executing setting" is OFF, the CPU 201 determines, by the user operation, whether the reference point P of the VR image, displayed at the center position of the mirror ball display area 451, indicates the zenith or the nadir in the above mentioned S373 to S376.

In S389, the CPU 201 performs processing to set the "Automatic execution setting" to ON. If the "Automatic execution setting" is ON, the CPU 201 determines, without depending on the user operation, whether the reference point P of the VR image displayed at the center position in the mirror ball display area 451 indicates the zenith or the nadir as in the above mentioned S377.

In S390, the CPU 201 changes the display on the display 205 to the "Normal display state".

In this embodiment, the reference point P is assumed to be displayed at the center position in the mirror ball display area 451, but the present invention is not limited to this. In other words, the reference point P may be displayed at an arbitrary position in the mirror ball display area 451. In this case, the mirror ball display area 451 may be an arbitrary shape, and is not limited to a circular shape. In this case as well, the user can easily determine that the reference point P indicates the zenith or the nadir if the actual horizontal line (horizon) extends circularly in the mirror ball display area 451. Here the "horizontal line extends circularly" need not be a state where the horizontal line is displayed throughout the mirror ball display area 451, but may be a state where only a part of the circle (e.g. semicircle) is displayed in the mirror ball display area 451.

Effect

According to this embodiment, the zenith or the nadir of the VR image can be easily determined by the user operation. Further, the information on the horizontal plane of the VR image can be corrected (determined) by the information on the zenith or the nadir. Therefore, when the VR image is displayed, distortion correction, such as correcting the horizontal line to a straight line, can be easily implemented by the user operation.

According to the present invention, the zenith or the nadir of the VR image can be easily determined by the user operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-22623, filed on Feb. 12, 2019, which is hereby incorporated by reference herein in its entirety.

What is claimed is:

1. An electronic apparatus, comprising:
   a processor; and
   a memory storing a program which, when executed by the processor, causes the electronic apparatus to:
   display, in a display area, at least a part including a reference point out of a VR image expressed by a projection format using a predetermined point as the reference point,
   change the reference point in case an instruction is received from a user, and
   determine the reference point as a zenith or a nadir of the VR image,
   wherein a circular line having a radius of a predetermined length, centered on the position of the reference point in the display area, is superimposed and displayed on the display area, and
   wherein the predetermined length is changed in accordance with a user operation.

2. The electronic apparatus according to claim 1, wherein the display area is circular.

3. The electronic apparatus according to claim 1, wherein the program which, when executed by the processor, further causes the electronic apparatus to: perform horizontal correction to correct information on a horizontal plane of the VR image by using the determined zenith or the nadir.

4. The electronic apparatus according to claim 1, wherein an image indicating the position of the reference point in the display area is superimposed and displayed on the display area.

5. The electronic apparatus according to claim 1, wherein 1) an image generated by two-dimensionally developing the VR image in a range to be displayed in the display area, based on information on a horizontal plane of the VR image, and 2) the display area are simultaneously displayed.

6. The electronic apparatus according to claim 1, wherein it is determined whether the reference point is the zenith or the nadir of the VR image, based on the position of the reference point and the VR image.

7. A control method of an electronic apparatus, comprising:
   a control step of 1) displaying, in a display area, at least a part including a reference point out of a VR image expressed by a projection format using a predetermined point as the reference point, and 2) changing the reference point in case an instruction is received from a user; and
   a determination step of determining the reference point as a zenith or a nadir of the VR image,
   wherein in the control step, 1) a circular line having a radius of a predetermined length, centered on the position of the reference point in the display area, is superimposed and displayed on the display area, and 2) the predetermined length is changed in accordance with a user operation.

8. A non-transitory computer readable medium that stores a program, wherein the program causes a computer to execute:
   a control step of 1) displaying at least a part, including a reference point, out of a VR image expressed by a projection format using a predetermined point as the reference point, and 2) changing the reference point in case an instruction is received from a user; and
   a determination step of determining the reference point as a zenith or a nadir of the VR image,
   wherein in the control step, 1) a circular line having a radius of a predetermined length, centered on the position of the reference point in the display area, is superimposed and displayed on the display area, and 2) the predetermined length is changed in accordance with a user operation.

* * * * *